United States Patent
Lin (10) Patent No.: US 9,090,017 B1
(45) Date of Patent: Jul. 28, 2015

(54) METHOD FOR MANUFACTURING FUNCTIONAL SEAMLESS SOFT BRA-CUP

(71) Applicant: GHI FU TECHNOLOGY CO., LTD., Chang Hua County (TW)

(72) Inventor: Li-Chi Lin, Chang Hua County (TW)

(73) Assignee: GHI FU TECHNOLOGY CO., LTD., Chang Hua County (TW)

( * ) Notice: Subject to any disclaimer, the term of this patent is extended or adjusted under 35 U.S.C. 154(b) by 0 days.

(21) Appl. No.: 14/298,444

(22) Filed: Jun. 6, 2014

(51) Int. Cl.
*B32B 37/00* (2006.01)
*B29C 51/10* (2006.01)
*B29C 65/08* (2006.01)
*A41C 3/10* (2006.01)
*A41C 5/00* (2006.01)
*A41D 27/24* (2006.01)
*B29K 105/00* (2006.01)
*B29K 101/12* (2006.01)
*B29L 31/48* (2006.01)

(52) U.S. Cl.
CPC . *B29C 51/10* (2013.01); *A41C 3/10* (2013.01); *A41C 5/005* (2013.01); *A41D 27/245* (2013.01); *B29C 65/08* (2013.01); *B29K 2101/12* (2013.01); *B29K 2105/256* (2013.01); *B29L 2031/4885* (2013.01)

(58) Field of Classification Search
CPC ........ A41D 27/245; A41C 5/005; A41C 3/10; B29C 33/424; B29C 43/021; B29C 43/20
USPC .............................. 156/73.1, 242, 272.2, 285
See application file for complete search history.

(56) References Cited

U.S. PATENT DOCUMENTS

| | | | |
|---|---|---|---|
| 8,251,772 B2 * | 8/2012 | Lin | 450/39 |
| 8,360,815 B2 * | 1/2013 | Cho | 450/39 |
| 2006/0025041 A1 * | 2/2006 | Falla et al. | 450/39 |
| 2006/0094333 A1 * | 5/2006 | Wood et al. | 450/39 |
| 2007/0004315 A1 * | 1/2007 | Luk et al. | 450/39 |
| 2011/0256801 A1 * | 10/2011 | Cho | 450/39 |
| 2011/0275279 A1 * | 11/2011 | Lin | 450/92 |

* cited by examiner

Primary Examiner — James Sells
(74) Attorney, Agent, or Firm — Ming Chow; Sinorica, LLC (57) ABSTRACT

A method for manufacturing a functional seamless soft bra-cup involves providing material sheets, heating, forming a first protective sheet, forming a second protective sheet, and finalizing a final product as the functional seamless soft bra-cup. A mold and a vacuum forming machine are first used to form plane material sheets into a first protective sheet and a second protective sheet. The first and second protective sheets are shaped according to a cavity of the mold. Functional material pieces are arranged between the first and second protective sheets. Then the mold and a heating device are used to bind the first and second protective sheets through high-frequency welding into the seamless soft bra-cup, which well fits a wearer's body profile and ensures wearing comfort.

10 Claims, 8 Drawing Sheets

METHOD FOR MANUFACTURING FUNCTIONAL SEAMLESS SOFT BRA-CUP

BACKGROUND OF THE INVENTION

1. Technical Field

The present invention relates to soft cups of brassieres, and more particularly to a method for manufacturing a functional seamless soft bra-cup.

2. Description of Related Art

Figure 1:
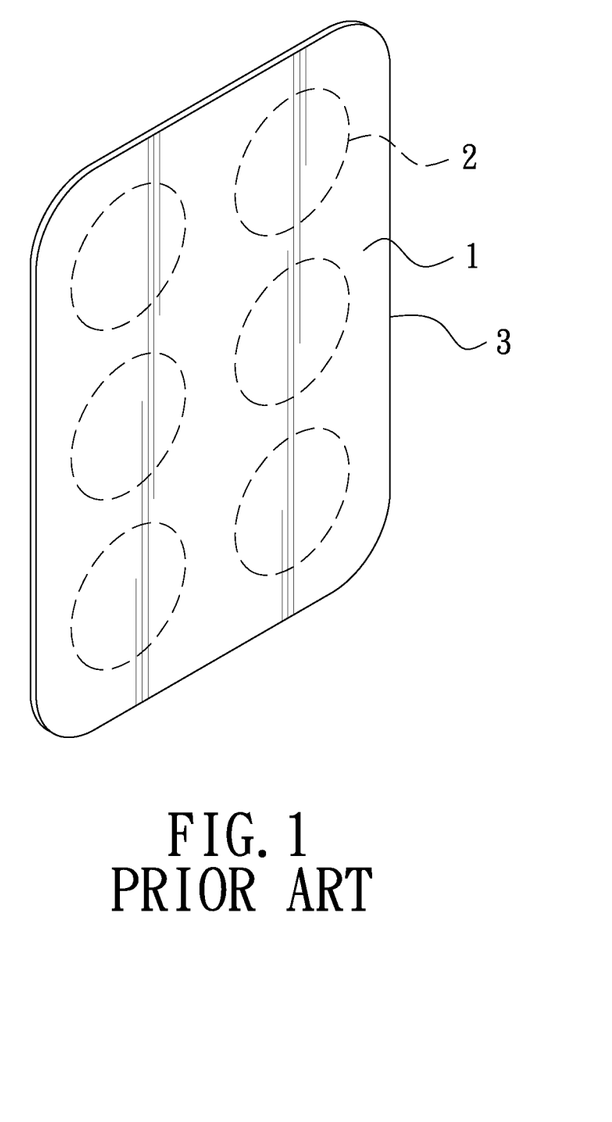
FIG. 1 shows a schematic drawing of a conventional packaged chip set.

Please refer to FIG. 1, which shows a schematic drawing of a conventional packaged chip set. For manufacturing such a packaged chip set 3, at least two pieces of holding film 1 are bond together with a plurality of chips 2 held therebetween. In use, the chip set 3 may by attached to a wearable object, such as an eyeshade or a waist band. When the wearable object is worn by a user, the chip set 3 emits far infrared rays to the user's body. Far infrared radiation outputs energy that resonates with and absorbed by water molecules in the user's body. The energy generates deformation vibration that promotes the body's blood circulation and metabolism, and breaks large molecular groups of water into small ones. Also, far infrared radiation provides disinfectant and deodorant effects, and is thus beneficial to human health.

The conventional packaged chip set 3 is formed by wrapping the chips 2 in the holding film 1. Since the holding film 1 is plane, the resultant chip set 3 is less three-dimensional and unable to significantly flex. Thus, a wearer wearing a wearable object containing the chip set 3 is constricted from free movement, and tends to feel uncomfortable as the chip set 3 is too stiff to fit the wearer's body profile. For solving this problem, some manufacturers have improved the foregoing conventional structure by sealing edges of the holding film 1 so as to make the holding film 1 three-dimensional, thereby allowing the chip set 3 to better fit wearers' body profile. However, this approach leads to junctions on the holding film 1, the three-dimensional shape of the holding film 1 is subject to inaccuracy, still failing to fit wearers' body profile satisfactorily. In addition, after long-term use or improper use, the junctions tend to deteriorate and get damaged, destroying the intended shape of the holding film 1. In view of this, the inventor of the present invention has recognized the need for further improving the conventional method for manufacturing packaged chip sets, and herein proposes the subject matter of the present invention.

SUMMARY OF THE INVENTION

One objective of the present invention is to provide a method for manufacturing a functional seamless soft bra-cup. The seamless soft bra-cup made using the manufacturing method can well fir wearer's body profile, thereby ensuring wearing comfort. For achieving the foregoing objective, the disclosed manufacturing method comprises the following steps: providing material sheets, which includes a plurality of plane material sheet made of a thermoplastic material; heating the plane material sheets using a heating means, so as to make the plane material sheets become plastic forming a first protective sheet by laying the plastic plane material sheets on a mold, which has a cavity, wherein the cavity includes therein a plurality of accommodating units, and is connected to a vacuum forming machine, so that when the vacuum forming machine generates vacuum suction, the plane material sheets are pulled inward the cavity and thus form the first protective sheet having a three-dimensional shape, in which a plurality of first receiving portions is formed on the first protective sheet by the accommodating units; forming a second protective sheet by laying another stack of said plastic plane material sheets on the mold, making the vacuum forming machine generate vacuum suction to pull the plane material sheets inward the cavity to form the second protective sheet having the same three-dimensional shape, in which a plurality of second receiving portions is formed on the second protective sheet by the accommodating units; and finalizing the functional seamless soft bra-cup by placing the first protective sheet on the mold, arranging a plurality of functional material pieces in the first receiving portions of the first protective sheet, placing the second protective sheet on the first protective sheet, such that the second protective sheet has the second receiving portions thereof covering at least the functional material pieces, and binding the first protective sheet and the second protective sheet together into the seamless soft bra-cup.

In the method of the present invention, the cavity of the mold and the vacuum suction of the vacuum forming machine jointly form the first and second protective sheets in accordance with the shape of the cavity of the mold, and functional material pieces are sandwiched between the first and second protective sheets, thereby forming the seamless soft bra-cup. As compared to the conventional packaged chip set, the functional seamless soft bra-cup made using the method of the present invention can perfectly fit wearers' body profile, thereby ensuring wearing comfort. Moreover, the seamless soft bra-cup is made through a multi-stage process composed of the foregoing steps, so the products are convenient in terms of packaging and transportation.

DETAILED DESCRIPTION OF THE INVENTION

Figure 2:
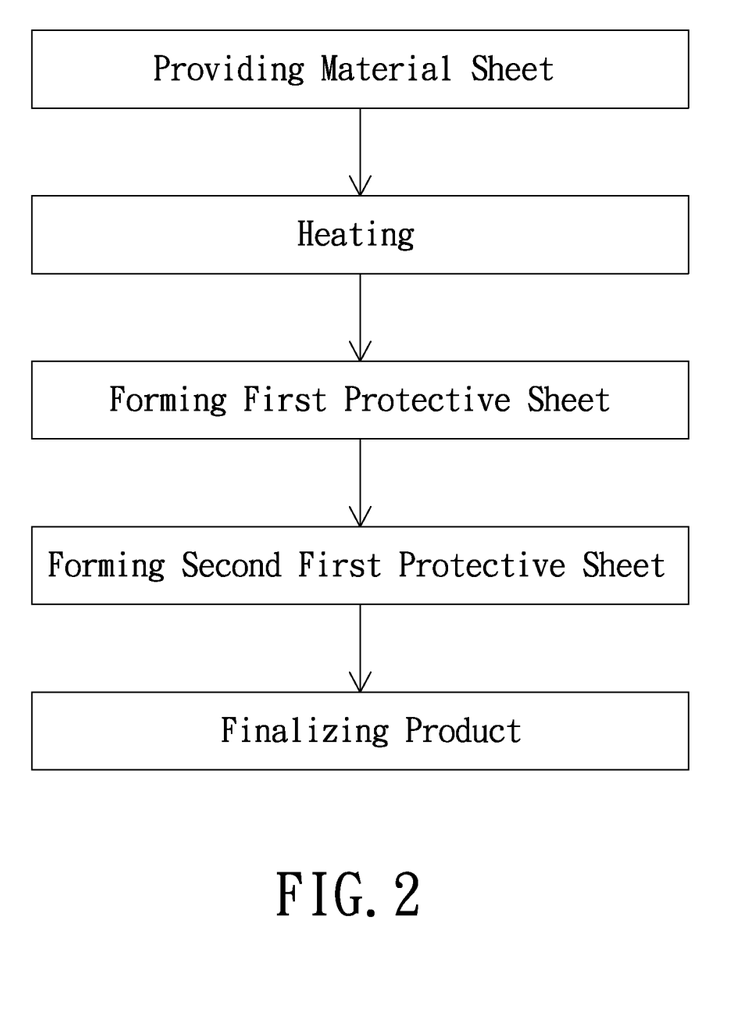
FIG. 2 is a flow chart of the method of the present invention.

Please refer to FIG. 2, which is a flow chart of the method of the present invention. The method is for manufacturing a functional seamless soft bra-cup, and comprises the following steps.

The first step is providing material sheets. In this step, a plurality of plane material sheets 10 made of thermoplastic material is provided. In the present embodiment, the plane material sheets 10 may be made of Ethylene Vinyl Acetate (EVA), Poly Vinyl Chloride (PVC), Polycarbonate (PC), Polyurethane (PU) or a laminated thermoplastic woven fabric.

Then is a heating step, wherein a heating means is used to heat the plane material sheets 10 to a temperature between 60° C. and 120° C. by, for example, baking, so as to make the plane material sheets 10 become plastic.

Figure 3:
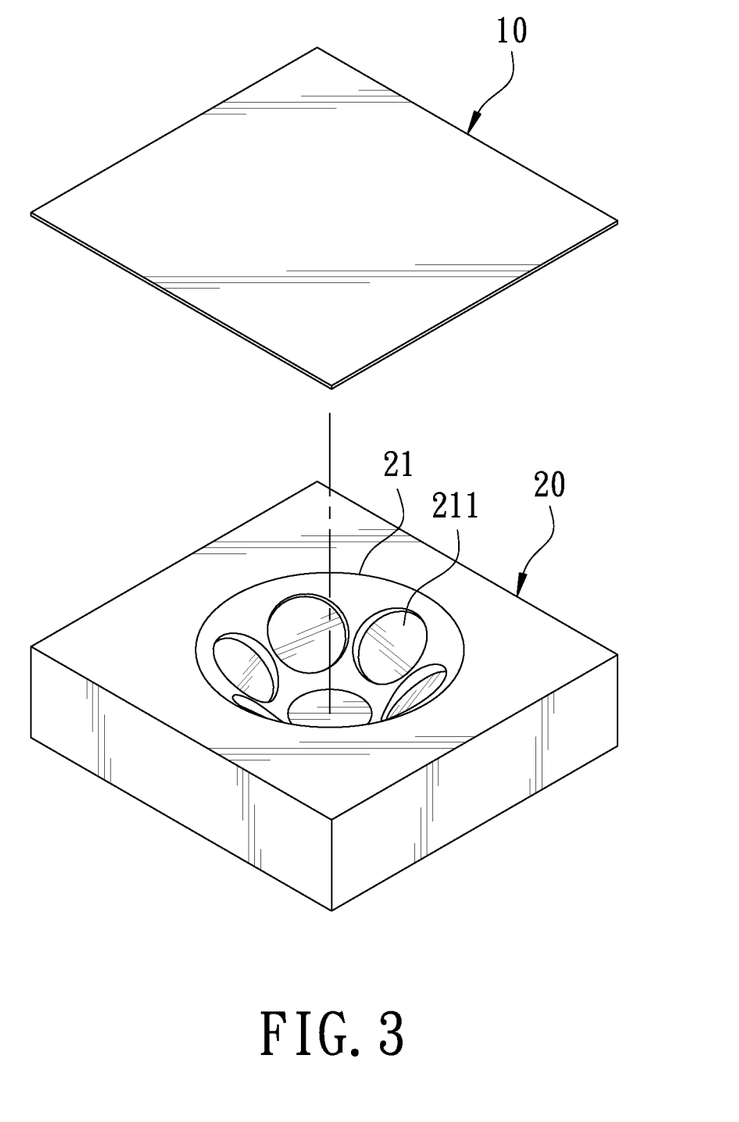
FIG. 3 illustrates how the first protective sheet is formed according to the present invention, wherein the plane material sheets are to be laid on the mold.

Following is a step for forming a first protective sheet. Please refer to FIG. 3 and FIG. 4 which illustrate how the first protective sheet is formed in the present invention by depicting the state where the plane material sheets 10 are about to cover a mold 20 and a state where a vacuum forming machine 30 is about to be activated. First, the plane material sheets 10 heated to become a plastic are laid over the mold 20. The mold 20 has a cavity 21. The plane material sheets 10 such cover the cavity 21 such that the material sheets 10 seal the cavity 21 from above. The cavity 21 may have a bowl-like shape, a wavy profile, or an arched three-dimensional shape. In the present embodiment, the cavity 21 have a bowl-like shape, and there are accommodating units 211 provided in the cavity 21. The cavity 21 has at least one through hole 212, which connects to a connecting tube 213. The connecting tube 213 has its end opposite to the through hole 212 connecting a vacuum forming machine 30. Please now refer to FIG. 5 for the schematic drawing showing the first protective sheet 11 is formed as the vacuum forming machine 30 has been activated. After activated, the vacuum forming machine 30 works to make the space between the wall of the cavity 21 and the plane material sheets 10 become vacuum, so the plane material sheets 10 come close to the wall of the cavity 21, thereby forming the three-dimensional first protective sheet 11. Therein, since the cavity 21 includes the accommodating units 211 each being a depression and separated from each other, the first protective sheet 11 when pulled toward the cavity 21 by the vacuum suction of the vacuum forming machine 30 gets into the accommodating units 211. The accommodating units 211 form a plurality of first receiving portions 111 on the first protective sheet 11. Thereby, as the first protective sheet 11 is shaped by the cavity 21 into a bowl-like structure, the first receiving portions 111 are shaped by the accommodating units 211 into depressions on the first protective sheet 11.

Now a step for forming a second protective sheet 12 is performed. Please refer to FIG. 3 and FIG. 4 again. This step repeats the step for forming the first protective sheet 11. First, another stack of said plane material sheets 10 are heated to become plastic and laid over the mold 20 that has the cavity 21 and the accommodating units 211. The through hole 212 in the cavity 21 connects the connecting tube 213 whose opposite end connects the vacuum forming machine 30. Please now refer to FIG. 5. As that is done for forming the first protective sheet 11, the vacuum forming machine 30 is activated to make the space in the cavity 21 become vacuum, thereby pulling the plane material sheets 10 inward the cavity 21 and thus forming the three-dimensional second protective sheet 12. Therein, since the cavity 21 includes the accommodating units 211, the second protective sheet 12 when pulled toward the cavity 21 by the vacuum suction of the vacuum forming machine 30 gets into the accommodating units 211. The accommodating units 211 form a plurality of second receiving portions 121 on the second protective sheet 12. Thereby, as the second protective sheet 12 is shaped by the cavity 21 into a bowl-like structure, the second receiving portions 121 are shaped by the accommodating units 211 into depressions on the second protective sheet 12. The second protective sheet 12 is structurally similar to the first protective sheet 11.

Figure 6:
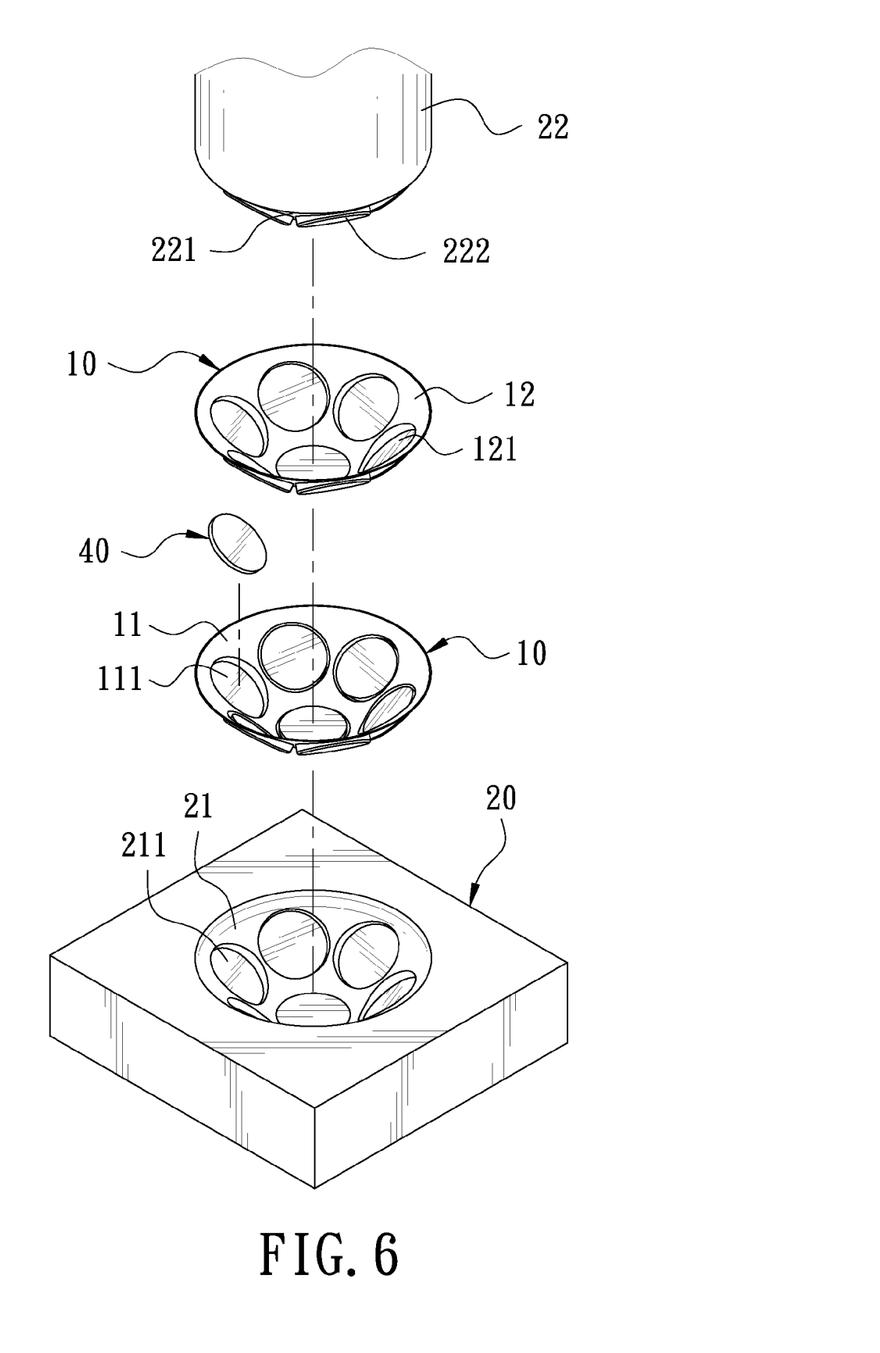
FIG. 6 illustrates how the seamless soft bra-cup of the present invention is finalized.

At last is a step for finalizing the final product. Please refer to FIG. 6, which illustrates how the above-mentioned components are finalized into a seamless soft bra-cup 40 of the present invention. Therein, the first protective sheet 11 formed as described previously is placed into the mold 20, and then plural functional material pieces 40 are placed into the first receiving portions 111 of the first protective sheet 11. Afterward, the second protective sheet 12 is placed over the first protective sheet 11 so that the second receiving portions 121 of the second protective sheet 12 cover the functional material pieces 40, meaning that the functional material pieces 40 are sandwiched between the first protective sheet 11 and the second protective sheet 12. Furthermore, the finalizing step involves using a heating device 22, which has a heating surface 221 facing the cavity 21. The heating surface 221 is provided with a plurality of protuberances 222 corresponding to the accommodating units 211 of the mold 20. For assembling the components, the heating surface 221 of the heating device 22 is drawn close to the wall of the cavity 21, so that the first protective sheet 11 and the second protective sheet 12 are pressed together by the cavity 21 and the heating surface 221. As a result, the first receiving portions 111, the functional material pieces 40 and the second receiving portions 121 are bound tight. Moreover, a high-frequency welding means is implemented. The high-frequency intermolecular bonding gives thermal resistance, so dielectric loss leads to generation of heat. Thereby, the first protective sheet 11 and the second protective sheet 12, due to their thermoplastic nature, are welded into a seamless soft bra-cup 50. Please refer to FIG. 7, which is a perspective view of the final product of the present invention, namely a seamless soft bra-cup 50. As shown, the seamless soft bra-cup 50 made using the disclosed method well fits wearers' body profile, and ensures the wearing comfort.

Additionally, in the present embodiment, the functional material pieces 40 may be chips, magnets, energy stone, medication or functional liquid. Taking chips for example, the chips may be made of cooper, carbon, silicon, manganese, phosphorous, sulfur, nickel, germanium, chromium, molybdenum, titanium and/or vanadium mixed in a certain proportion, and therefore are capable of emitting far Infrared rays. Far infrared radiation outputs energy that resonates with and absorbed by water molecules in the user's body. The energy generates deformation vibration that promotes the body's blood circulation and metabolism, and breaks large molecular groups of water into small ones. Also, far infrared radiation provides disinfectant and deodorant effects. Therefore the seamless soft bra-cup 50 is endowed with various advantages and benefits. The disclosed method for manufacturing the functional seamless soft bra-cup thus can include adding different functional material pieces that meet wearers' various needs.

Figure 4:
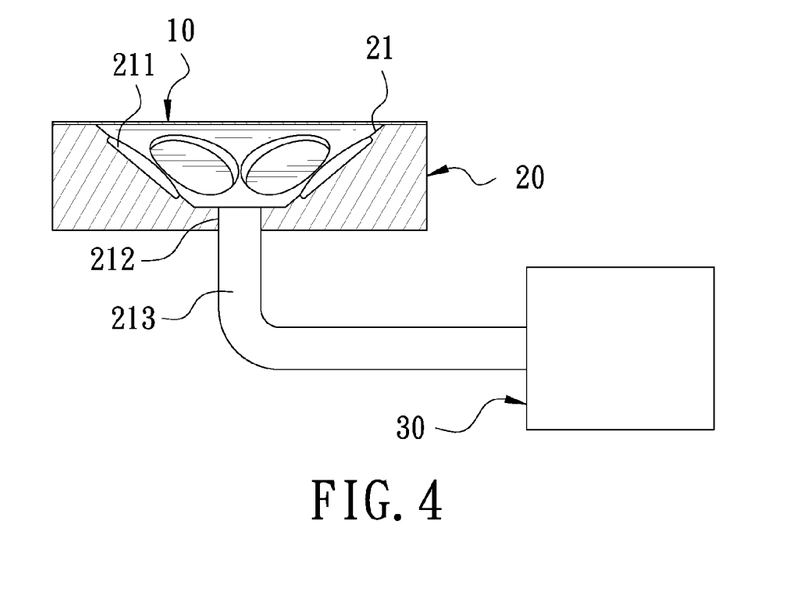
FIG. 4 illustrates how the first protective sheet is formed according to the present invention, wherein the vacuum forming machine has not been activated.
Figure 5:
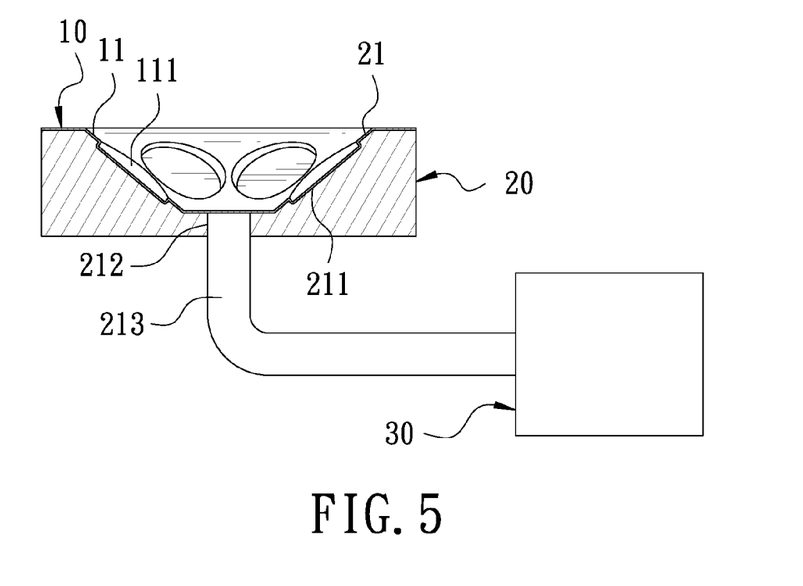
FIG. 5 is a schematic drawing showing the first protective sheet is formed as the vacuum forming machine has been activated.
Figure 7:
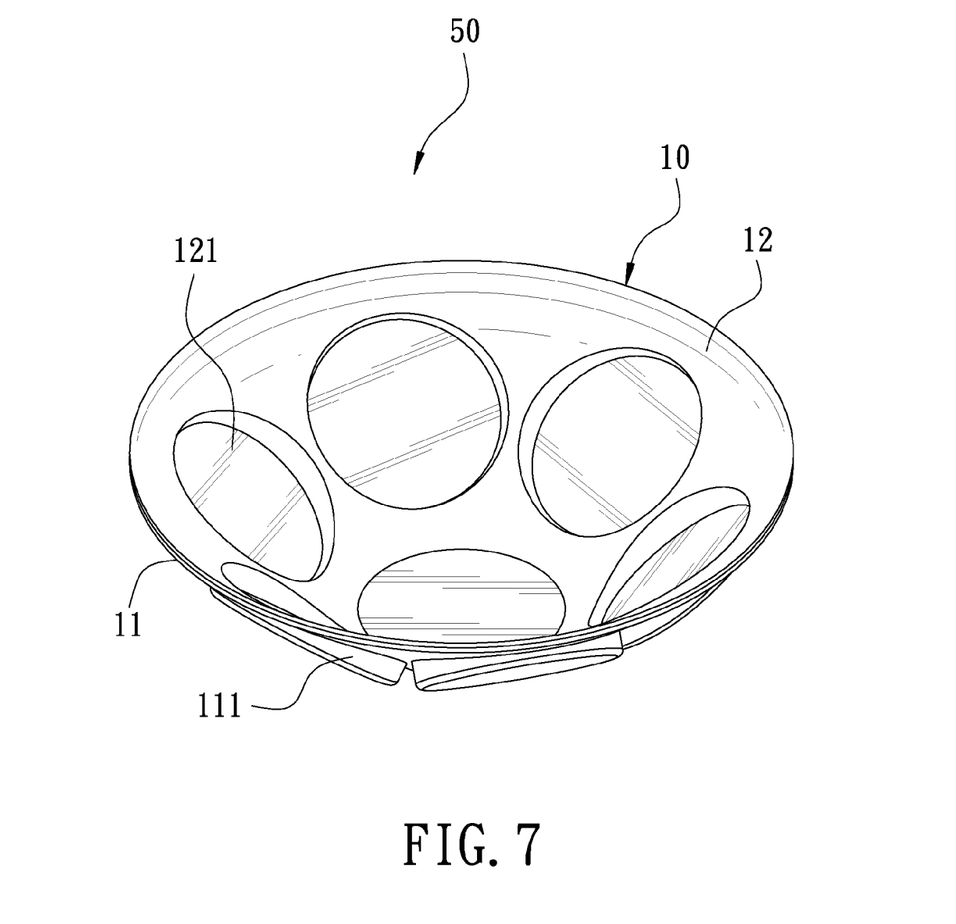
FIG. 7 is a perspective view of the final product of the present invention.

Please refer to FIG. 4 and FIG. 5. In the disclosed method, the relationship between the cavity 21 of the mold 20 and the vacuum suction from the vacuum forming machine 30 makes the first protective sheet 11 and the second protective sheet 12 formed in accordance with the cavity 21 of the mold 20. Then referring to FIG. 6 and FIG. 7, the functional material pieces 40 are arranged between the first protective sheet 11 and the second protective sheet 12 and then the thermoplastic first and second protective sheets 11, 12 are bound through high-frequency welding into the seamless soft bra-cup 50. Referring to FIG. 7, the disclosed functional seamless soft bra-cup 50, as compared to a final product made through the conventional chip-set packaging procedure, better fits wearers' body profile, thereby ensuring wearing comfort, and ensuring good performance of the functional material pieces 40 as they are drawn close to a wearer's body.

Figure 8:
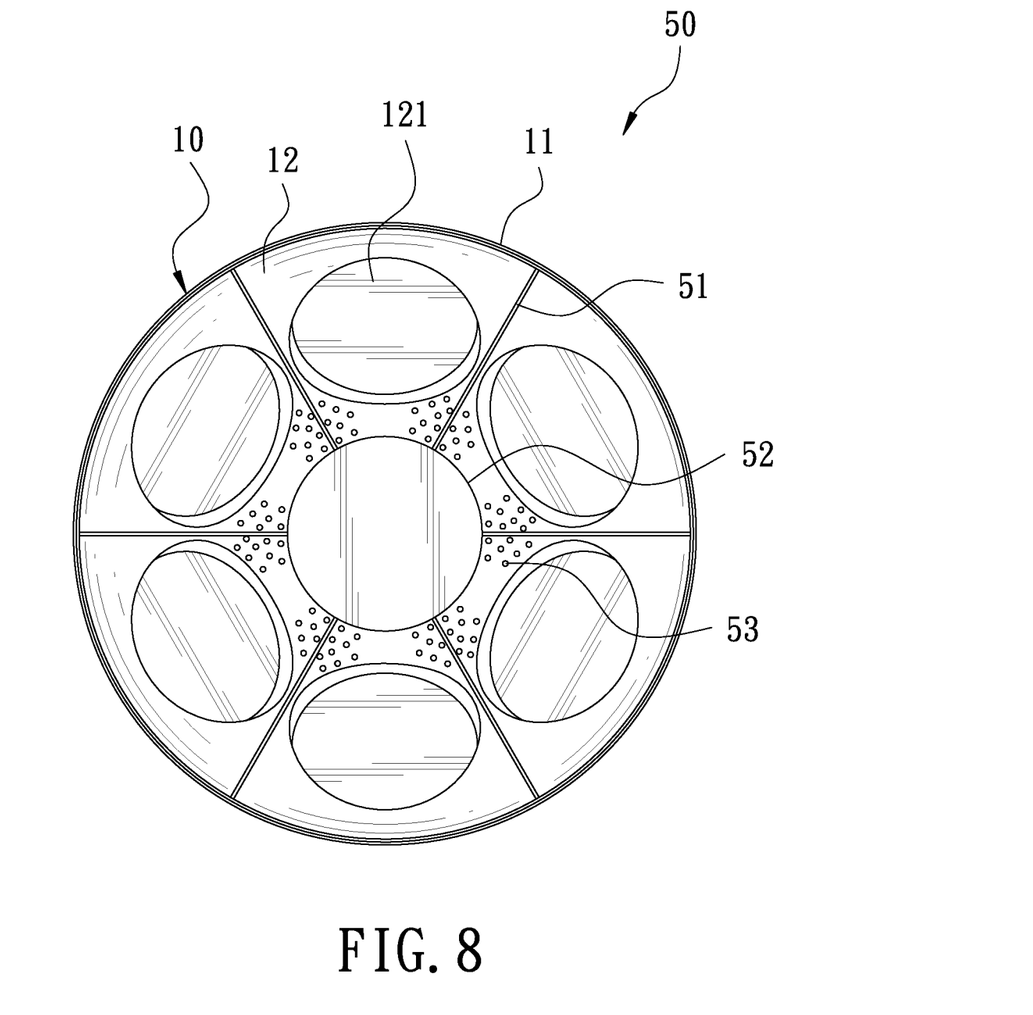
FIG. 8 is a top view of the final product of the present invention.

Please refer to FIG. 8, which is a top view of the final product of the present invention. The finalizing step may further include forming a fold 51 on the seamless soft bra-cup 50 between each two said functional material pieces 40. The folds 51 are radially arranged with their centripetal ends converging on at least one perforated hole 52. In the present embodiment, the fold 51 may be in the form of a slot or a suture, and the perforated hole 52 is formed at the center of the seamless soft bra-cup 50, so the seamless soft bra-cup 50 is more flexible. Moreover, a plurality of vents 53 is provided on the seamless soft bra-cup 50. The vents 53 are distributed between the functional material pieces 40 and the perforated hole 52, for allowing ventilation, thereby enhancing the wearing comfort of the seamless soft bra-cup 50. Additionally, the folds 51 enable the seamless soft bra-cup 50 to free bend and flex, so the seamless soft bra-cup 50 can better fit its wearer's profile.

Figure 9:
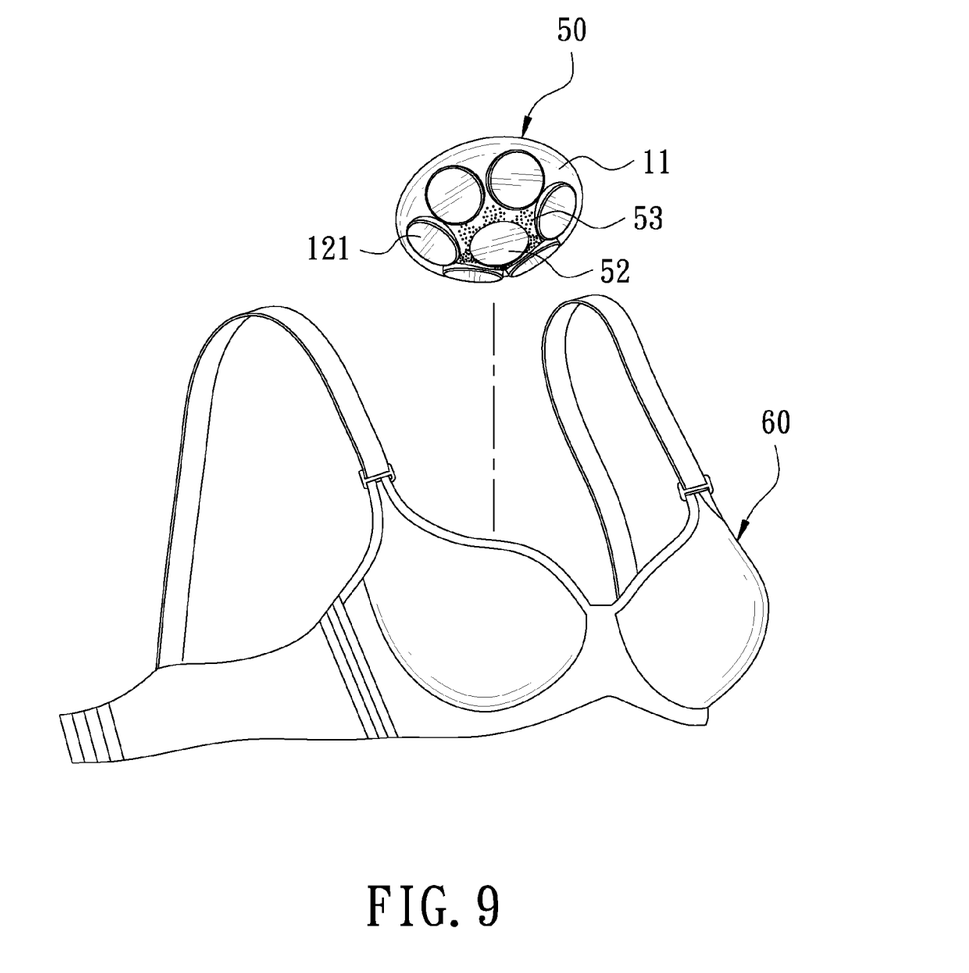
FIG. 9 is an applied view of the final product of the present invention.

Now please refer to FIG. 9, which is an applied view of the final product of the present invention. The seamless soft bra-cup 50 may be assembled to a wearing object 60, such as a brassiere. When a wearer wears the brassiere, the functional material pieces 40 provide treatment to the wearer. Taking the chips of the first preferred embodiment as mentioned above for example, the chips give out far infrared radiation that helps promoting the wearer's blood circulation and metabolism. Moreover, with the folds 51 and the perforated hole 52, the seamless soft bra-cup 50 can bend and flex to make the wearing object 60 well match the wearer's breast profile. This plus the good ventilation ensured by the vents 53 makes wearing the wearing object 60 a comfortable experience.

It is to be noted that in the method of the present invention, the seamless soft bra-cup 50 is made through a multi-stage process composed of the foregoing steps, so the products are convenient in terms of packaging and transportation. Besides, since the seamless soft bra-cup 50 is made of thermoplastic material through the disclosed novel manufacturing process, the manufacturing costs can be reduced and the productivity can be improved. Moreover, the seamless soft bra-cup 50 is formed as an integrated structure without sewing seams, so it has pleasing appearance, good durability, and good conformability to wearers' body profile, thereby ensuring wearing comfort.

What is claimed is:

1. A method for manufacturing a functional seamless soft bra-cup, comprising the following steps:
   providing material sheets, which includes a plurality of plane material sheet made of a thermoplastic material;
   heating the plane material sheets using a heating means, so as to make the plane material sheets become plastic;
   forming a first protective sheet by laying the plastic plane material sheets on a mold, which has a cavity, wherein the cavity includes therein a plurality of accommodating units, and is connected to a vacuum forming machine, so that when the vacuum forming machine generates vacuum suction, the plane material sheets are pulled inward the cavity and thus form the first protective sheet having a three-dimensional shape, in which a plurality of first receiving portions is formed on the first protective sheet by the accommodating units;
   forming a second protective sheet by laying another stack of said plastic plane material sheets on the mold, making the vacuum forming machine generate vacuum suction to pull the plane material sheets inward the cavity to form the second protective sheet having the same three-dimensional shape, in which a plurality of second receiving portions is formed on the second protective sheet by the accommodating units; and
   finalizing the functional seamless soft bra-cup by placing the first protective sheet on the mold, arranging a plurality of functional material pieces in the first receiving portions of the first protective sheet, placing the second protective sheet on the first protective sheet, such that the second protective sheet has the second receiving portions thereof covering at least the functional material pieces, and binding the first protective sheet and the second protective sheet together into the seamless soft bra-cup.

2. The method of claim 1, wherein the cavity has a bowl-like shape, a wavy profile, or an arched three-dimensional shape, so as to form the first protective sheet and the second protective sheet into the same bowl-like shape, wavy profile, or arched three-dimensional shape.

3. The method of claim 1, wherein the heating means heat the plane material sheets to a temperature between 60° C. and 120° C.

4. The method of claim 1, wherein the heating means includes heating the plane material sheets by baking.

5. The method of claim 1, wherein in the step of finalizing the functional seamless soft bra-cup, further comprising using a heating device, which has a heating surface facing the cavity, so that the first protective sheet and the second protective sheet are bound by the cavity and the heating surface jointly.

6. The method of claim 5, wherein in the step of finalizing the functional seamless soft bra-cup, the heating surface is provided with a plurality of protuberances corresponding to the accommodating units of the mold.

7. The method of claim 1, wherein the plane material sheets are made of EVA, PC, PU, PVC or a laminated thermoplastic woven fabric.

8. The method of claim 1, wherein the functional material piece is a chip, a magnet, a medication, an energy stone or a functional liquid.

9. The method of claim 5, wherein the first protective sheet and the second protective sheet are bound through high-frequency welding.

10. The method of claim 1, wherein in the step of finalizing the functional seamless soft bra-cup, further comprises forming folds on the formed functional seamless soft bra-cup between the functional material pieces, and forming at least one perforated hole at ends of the folds centripetally converging.

* * * * *